United States Patent
Hermann

(10) Patent No.: US 11,104,390 B2
(45) Date of Patent: Aug. 31, 2021

(54) MOTOR VEHICLE WITH AIR-GUIDE AND DRIVE

(71) Applicant: Dr. Ing. h.c. F. Porsche Aktiengesellschaft, Stuttgart (DE)

(72) Inventor: Felix Hermann, Leonberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 48 days.

(21) Appl. No.: 16/439,774

(22) Filed: Jun. 13, 2019

(65) Prior Publication Data

US 2019/0382062 A1 Dec. 19, 2019

(30) Foreign Application Priority Data

Jun. 18, 2018 (DE) .................... 10 2018 114 505.5

(51) Int. Cl.
- *B62D 35/00* (2006.01)
- *B62D 27/06* (2006.01)
- *B62D 65/16* (2006.01)
- *B62D 25/08* (2006.01)

(52) U.S. Cl.
CPC ......... *B62D 35/007* (2013.01); *B62D 27/065* (2013.01); *B62D 25/087* (2013.01); *B62D 65/16* (2013.01)

(58) Field of Classification Search
CPC . B60N 3/023; B60P 3/32; E05B 73/00; B62D 35/007; B62D 27/065; B62D 25/087; B62D 65/16

See application file for complete search history.

(56) References Cited

U.S. PATENT DOCUMENTS

| | | | | |
|---|---|---|---|---|
| 4,863,213 A * | 9/1989 | Deaver | ................ | B62D 35/001 296/180.1 |
| 5,013,081 A * | 5/1991 | Cronce | ................ | B62D 35/007 296/180.1 |
| 5,236,242 A * | 8/1993 | Seeman | ................ | B62D 35/001 296/180.1 |
| 5,324,092 A * | 6/1994 | Burg | .................... | B62D 35/007 296/180.1 |
| 7,895,709 B2 * | 3/2011 | Shishikura | .............. | F16B 5/025 16/2.1 |
| 8,419,099 B2 * | 4/2013 | Inoue | ...................... | B60J 5/107 296/1.08 |
| 9,327,779 B1 * | 5/2016 | Wey | ...................... | B62D 35/005 |

(Continued)

FOREIGN PATENT DOCUMENTS

| | | |
|---|---|---|
| DE | 102009022684 A1 | 12/2010 |
| DE | 102010000634 A1 | 9/2011 |
| GB | 2478414 B | 6/2012 |

*Primary Examiner* — Lori L Lyjak
(74) *Attorney, Agent, or Firm* — Leydig, Voit & Mayer, Ltd.

(57) ABSTRACT

A motor vehicle has a body; an air-guide, fastenable to the body; a drive to adjust the air-guide when the air-guide is fastened to the body; and connectors that connect the drive to the body. The connectors include first fastening elements and second fastening elements. The first fastening elements are insertable through cutouts in the body into the second fastening elements via a first position up to a second position. An orientation of the drive relative to the body is possible in the first position, and the second fastening elements exert a clamping force on the first fastening elements in the second position.

10 Claims, 3 Drawing Sheets

(56) References Cited

U.S. PATENT DOCUMENTS

| | | | |
|---|---|---|---|
| 2005/0168013 A1* | 8/2005 | Rinklin | B62D 35/007 |
| | | | 296/180.1 |
| 2011/0309652 A1 | 12/2011 | Eichentopf et al. | |
| 2014/0373409 A1* | 12/2014 | Blanks | G09F 23/06 |
| | | | 40/592 |
| 2015/0274223 A1* | 10/2015 | Wolf | B62D 37/02 |
| | | | 296/180.5 |
| 2016/0355219 A1* | 12/2016 | Cooper | B62D 35/007 |
| 2018/0154746 A1* | 6/2018 | Lee | B29C 65/02 |

\* cited by examiner

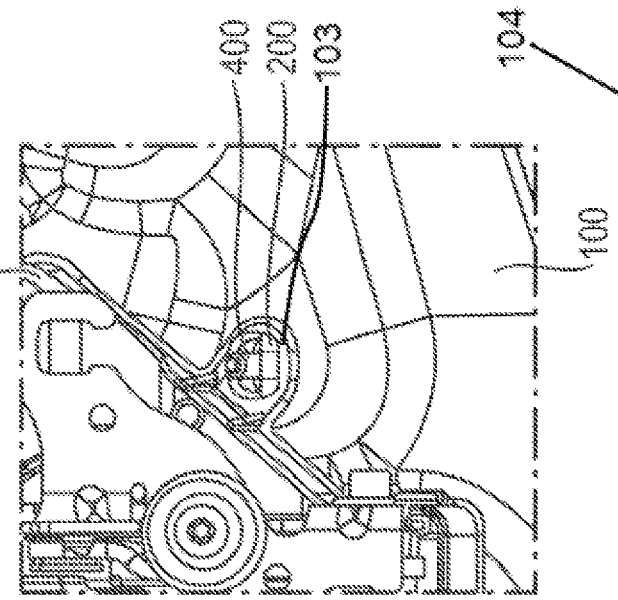
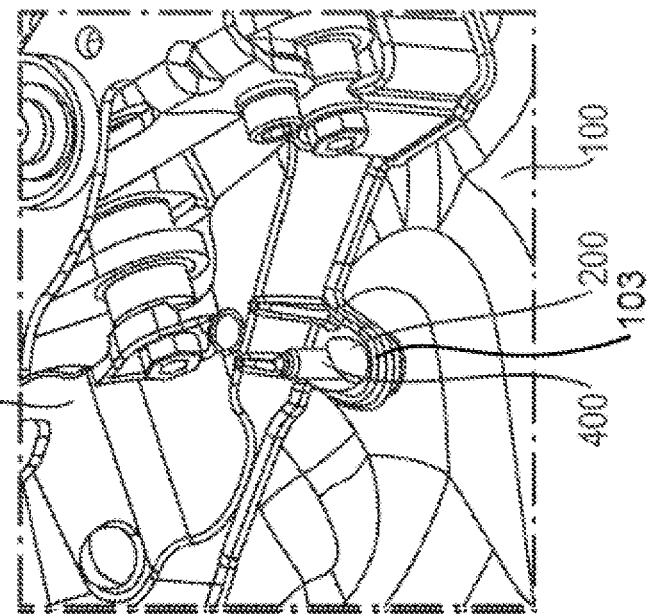
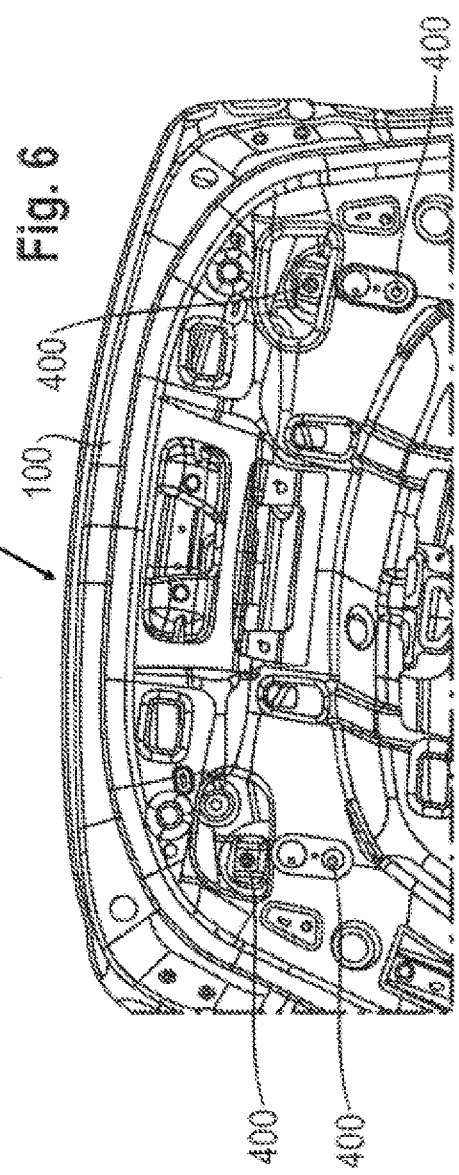

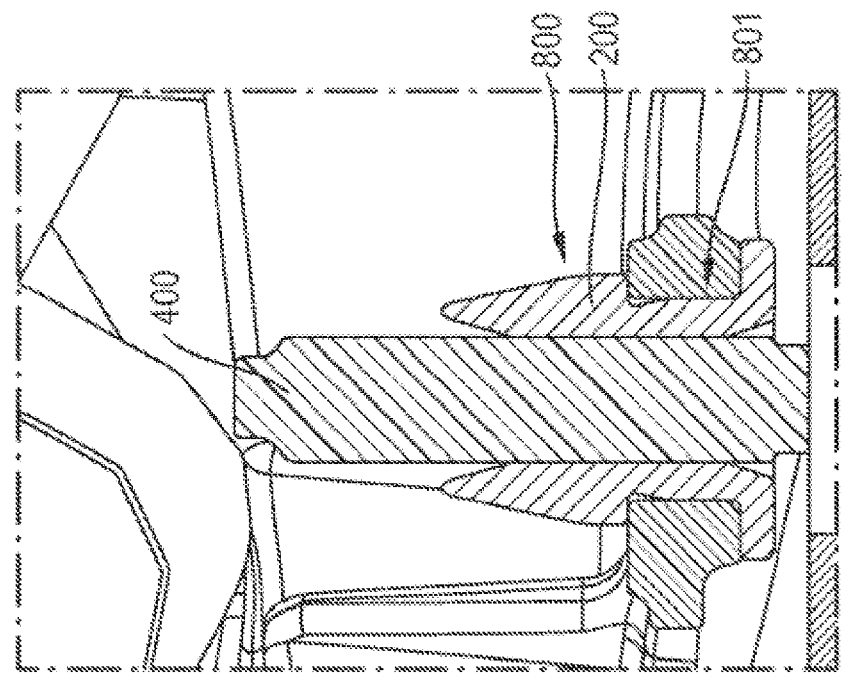
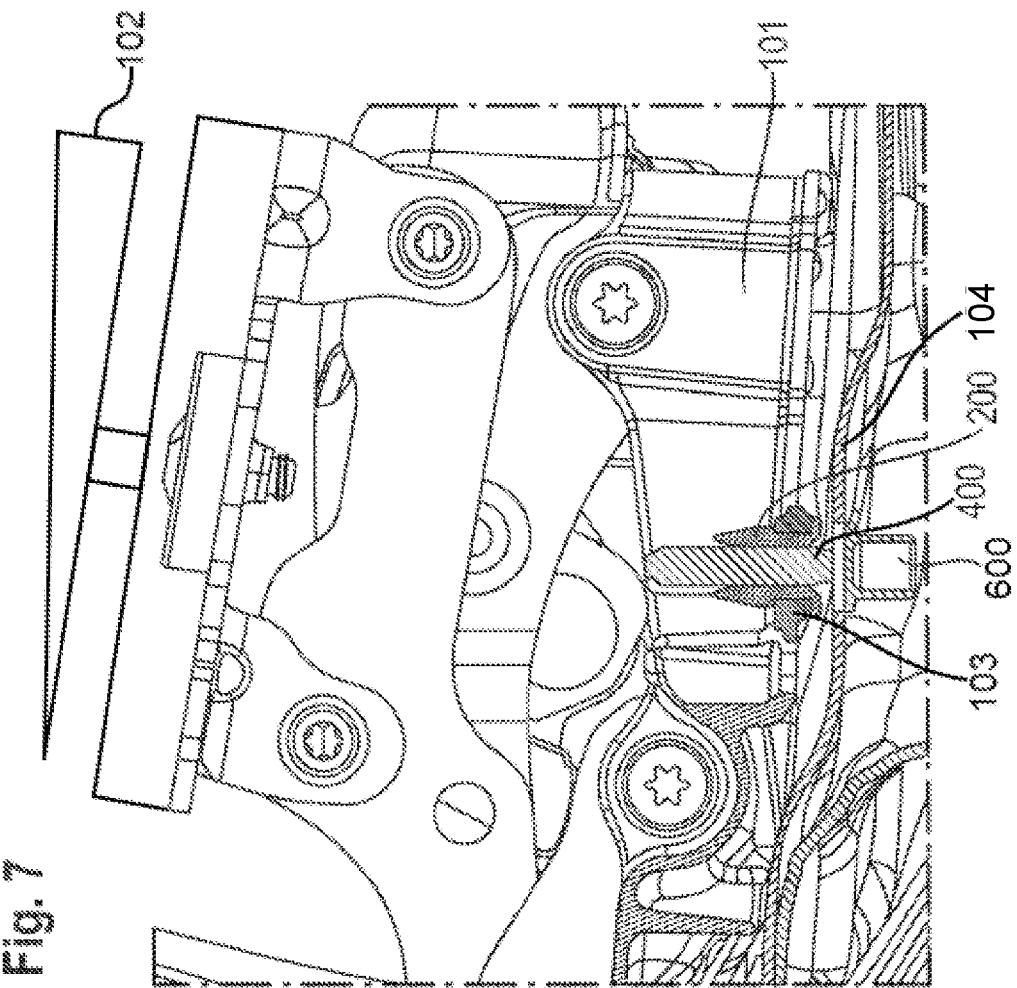

MOTOR VEHICLE WITH AIR-GUIDE AND DRIVE

CROSS-REFERENCE TO PRIOR APPLICATIONS

Priority is claimed to German Patent Application No. DE 10 2018 114 505.5, filed on Jun. 18, 2018, the entire disclosure of which is hereby incorporated by reference herein.

FIELD

The present invention relates to a motor vehicle having an air-guide and drive.

BACKGROUND

Motor vehicles can have air-guiding means (air-guide), which are frequently also referred to as spoilers. Air-guiding means, in particular rear spoilers, can be retracted and extended. Use is made for this purpose of a drive means (drive), which is usually arranged below the air-guiding means.

During the production of a motor vehicle, the drive means must be fastened to the body of the motor vehicle. DE 10 2010 000 634 A1 discloses that centering pins are used to fasten the drive means to the body in the desired position.

SUMMARY

An embodiment of the present invention provides a motor vehicle that has a body; an air-guide, fastenable to the body; a drive to adjust the air-guide when the air-guide is fastened to the body; and connectors that connect the drive to the body. The connectors include first fastening elements and second fastening elements. The first fastening elements are insertable through cutouts in the body into the second fastening elements via a first position up to a second position. An orientation of the drive relative to the body is possible in the first position, and the second fastening elements exert a clamping force on the first fastening elements in the second position.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 4 shows an enlarged detail from FIG. 1;

FIG. 5 shows an enlarged detail from FIG. 1;

FIG. 6 shows a schematic perspective view of the motor vehicle from FIG. 1;

FIG. 7 shows a schematic sectional view through first and second fastening elements; and FIG. 8 shows an enlarged detail from FIG. 7.

DETAILED DESCRIPTION

Figure 1:
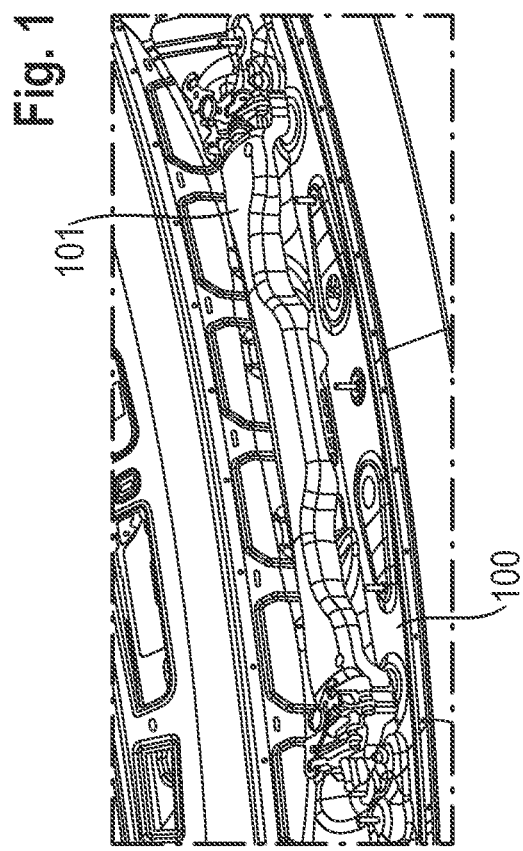
FIG. 1 shows a schematic perspective view of a subregion of a motor vehicle according to one embodiment of the invention having a drive means, which is fastened to the body of the motor vehicle and intended for adjusting an air-guiding means.
Figure 2:
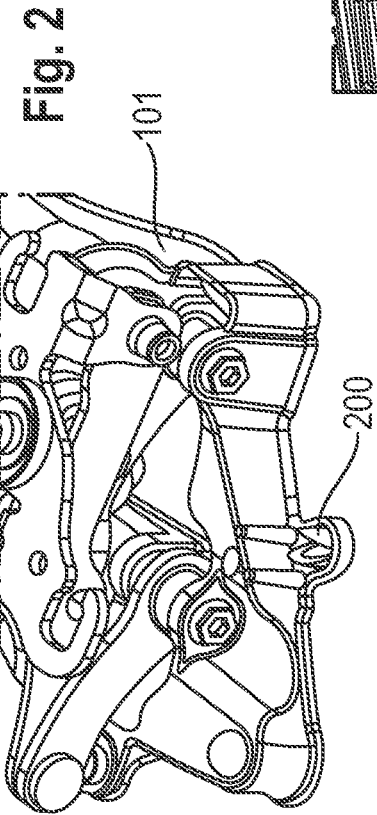
FIG. 2 shows a schematic perspective view obliquely from above of a subregion of a drive means for a rear spoiler.
Figure 3:
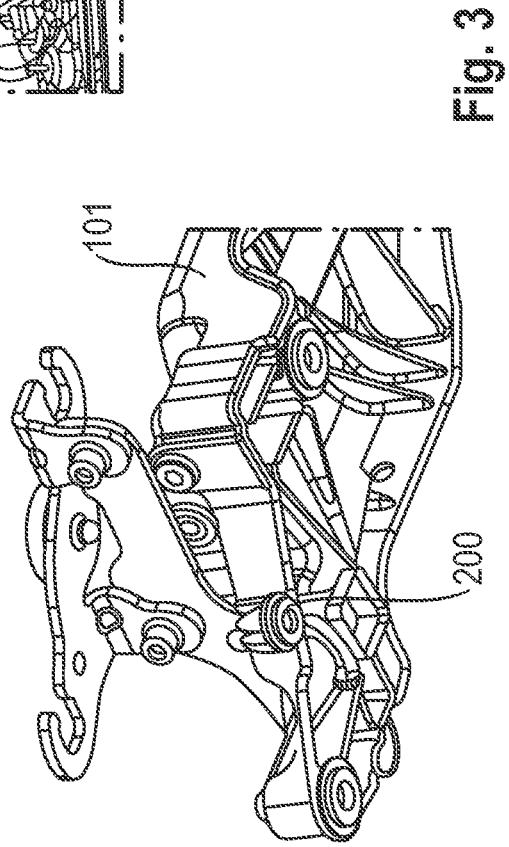
FIG. 3 shows a schematic perspective view obliquely from below of the subregion from FIG. 2.

Embodiments of the present invention simplify the fastening of the drive means (drive) to the motor vehicle.

A motor vehicle has a body, an air-guiding means (an air guide) which can be fastened to the body, a drive means (a drive) for adjusting the air-guiding means in the state in which it is fastened to the body, and connecting means (connectors) for connecting the drive means to the body.

Within the context of this description, an air-guiding means (air guide) is to be understood in particular to mean a component which redirects air during the operation of the motor vehicle as intended and uses the resultant forces to improve the driving properties of the motor vehicle. For example, the air-guiding means can be designed to redirect the air in such a way that the road grip of the motor vehicle is increased.

The drive means (drive) can be an electric motor, for example.

The connecting means (connectors) include a plurality of first and a plurality of second fastening elements. Here, the second fastening elements can preferably be arranged on the drive means. What is to be understood in particular within the context of this description is that the second fastening elements can be arranged, for example, on a mounting support for the drive means. The first fastening elements can be inserted through cutouts in the body into the second fastening elements via a first position up to a second position.

Here, an orientation of the drive means relative to the body is possible in the first position. Such an orientation can also be possible in the second position. In the second position, the second fastening elements exert a clamping force on the first fastening elements, with the result that the first and second fastening elements are connected to one another. Since the first fastening elements project through the cutouts of the body and the second fastening elements are arranged on the drive means, the drive means is thus connected to the body.

The clamping connection between the first and second fastening elements can be produced in a particularly simple manner by a force being exerted on the drive means in the direction of the first fastening elements. It is thus possible for the drive means to be fastened to the body in a particularly simple manner. In addition, the drive means can be removed from the body in a simple manner, for example for repair or maintenance.

According to one embodiment of the invention, the second fastening elements can have a first region and a second region. The first fastening elements can project only into the respective first region in the first position. If the first fastening elements are in the first position, the second regions can be free from the respective first fastening element. In this way, the first fastening elements can be introduced into the second fastening elements and oriented in a particularly simple manner.

According to one embodiment of the invention, the second fastening elements can each have, in the first region, a cylindrical cross-sectional area which substantially corresponds to the cross-sectional area of the region of the first fastening elements which projects into the second fastening elements in the second position. What is to be understood in particular by this within the context of this description is that, for example, the outer periphery of the cross-sectional area of the first fastening elements corresponds approximately to the inner periphery of the cross-sectional area of the second fastening elements in the first region.

According to one embodiment of the invention, the cutouts in the body can be designed for a displacement of the first fastening elements in the state in which they project through the cutouts. This allows an orientation of the drive means relative to the body in order to compensate for assembly and/or production tolerances.

According to one embodiment of the invention, at least a first of the cutouts can be designed as an oblong hole. This allows a displacement of the drive means relative to the body in a first dimension, with the result that assembly and production tolerances in the first dimension can be compensated for.

According to one embodiment, at least a second of the cutouts can be designed for a displacement, in two mutually perpendicular directions, of the first fastening element which projects through the second cutout. This allows a displacement of the drive means relative to the body in the first and a second dimension, with the result that assembly and production tolerances in the first and the second dimension can be compensated for.

According to one embodiment of the invention, the first fastening elements can have a thread. The connecting means can have third fastening elements which can be screwed onto the thread of the first fastening elements. These third fastening elements can be used to reinforce the connection of the drive means to the body.

According to one embodiment of the invention, the drive means can be fixable to the body by the third fastening elements being screwed in the direction of the second fastening elements. In the fixed state, the drive means can be fastened to the body in such a way that a displacement due to forces occurring during the operation of the motor vehicle as intended is impossible. In this case, the connection between the first and second fastening elements can serve merely to ensure that the drive means is fitted captively on the body during the mounting process. The actual fastening occurs first by screwing the third fastening elements onto the first fastening elements.

According to one embodiment of the invention, the air-guiding means can be designed as a rear spoiler which is fastened to a tailgate of the body. Here, the tailgate can be designed, for example, as a lid and can conceal an interior space which can be used, for example, as a luggage compartment or in which an engine is arranged. The cutouts can be arranged in the tailgate. The tailgate can be opened and closed. The third fastening elements, in the state in which they are screwed onto the first fastening elements, can be concealed when the tailgate is closed. They can thus be arranged within the interior space, whereas the second fastening elements can be arranged outside the interior space.

According to a method of the present invention, the drive means is first placed on the closed tailgate of the motor vehicle, with the result that the first fastening elements which project through the tailgate are introduced into second fastening elements up to a first position. Here, the second fastening elements are arranged on the drive means.

The first fastening elements are then introduced further into the second fastening elements up to a second position in which the second fastening elements exert a clamping force on the first fastening elements. In this state, the drive means are sufficiently fastened to the tailgate for the tailgate to be able to be opened without the drive means falling down.

The tailgate is then opened. With the tailgate opened, the third fastening elements are then screwed onto the first fastening elements, with the result that the tailgate is clamped in between the third and the second fastening elements. For this purpose, the first fastening elements can have an external thread, for example, and the third fastening elements can have an internal thread.

Further features and advantages of the present invention will become clear from the following description of preferred exemplary embodiments with reference to the appended drawings. Here, the same reference signs are used for identical or similar components and for components with identical or similar functions.

A motor vehicle has a body 100 to which a drive means 101 for adjusting an air-guiding means 102, such as, for example, a rear spoiler, is fastened by connecting means. On the drive means 101 there are arranged second fastening elements 200 into which first fastening elements 400 are introduced during the mounting operation on the motor vehicle. If the first fastening elements 400 project sufficiently far into the second fastening elements 200, they are held there by a clamping force, with the result that the drive means 101 are connected to the body. This can be achieved by a simple plugging of the second fastening elements 200 onto the first fastening elements 400.

Here, the first fastening elements 400 project through cutouts 103 in the body. The cutout 103 illustrated in FIG. 4 here allows a movement, in two dimensions, of the first fastening element 400 projecting through it, whereas the cutout 103 illustrated in FIG. 5 is designed as an oblong hole and allows a movement, only in a single dimension, of the first fastening element 400 projecting through it. By virtue of this possible displaceability of the first fastening elements 400 relative to the body, assembly and production tolerances can be compensated for and the drive means 101 can be positioned as desired.

The connection of the first fastening elements 400 to the second fastening elements 200 is sufficient during the mounting operation to ensure that a tailgate 104 can be opened without the drive means 101 becoming detached from the body 100, as is illustrated in FIG. 6. In order to achieve a fixing of the drive means 101 to the body 100 that is sufficient for the operation of the motor vehicle as intended, third fastening elements 600 are screwed onto the first fastening elements 400. The cutout 103 illustrated in FIG. 7 shows a cross-sectional view of a first fastening element 400 projecting into a second fastening element 200, with a third fastening element 600 screwed onto the first fastening element 400. This occurs, with the tailgate 104 opened, on the side of the body that points away from the second fastening elements 200. The body 100 is thus clamped in between the third fastening elements 600 and the second fastening elements 200, with the result that the drive means 101 is sufficiently fastened to the body 100.

The clamping force exerted by the second fastening elements 200 on the first fastening elements 400 is achieved by the fact that the second fastening elements 200 have a first region 801 and a second region 800. Here, the cross-sectional shape of the first region 801 corresponds approximately to the cross-sectional shape of the first fastening elements 400. The second fastening elements 200 are elastically deformed in the second region 800 if the first fastening elements 400 are introduced into it. By virtue of the elasticity, the second fastening elements 200 then exert a clamping force on the first fastening elements 400.

If the drive means 101 is intended to be released from the body 100, the third fastening elements 600 have to be unscrewed from the first fastening elements 400. The drive means 101 can then be removed in a simple manner with a sufficiently large force.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A motor vehicle, the motor vehicle comprising:
    a body;
    an air-guide, which is fastenable to the body;
    a drive configured to adjust the air-guide in a state in which the air-guide is fastened to the body; and
    connectors that connect the drive to the body,
    wherein the connectors comprise a plurality of first fastening elements and a plurality of second fastening elements,
    wherein the first fastening elements are insertable through cutouts in the body into a mounting position within the second fastening elements and then further insertable into the second fastening elements up to a clamping position,
    wherein an orientation of the drive relative to the body is possible in the mounting position, and
    wherein the second fastening elements exert a clamping force on the first fastening elements in the clamping position.

2. The motor vehicle as claimed in claim 1,
    wherein the second fastening elements have a first region and a second region,
    wherein the first fastening elements project only into the respective first region in the mounting position, and
    wherein the respective second region is free from the respective first fastening element if the first fastening elements are in the mounting position.

3. The motor vehicle as claimed in claim 2, wherein the second fastening elements each have, in the first region, a cylindrical cross-sectional area which substantially corresponds to the cross-sectional area of a region of the first fastening elements which projects into the second fastening elements in the mounting position.

4. The motor vehicle as claimed in claim 1, wherein the cutouts in the body are configured to allow a displacement of the first fastening elements in the state in which the first fastening elements project through the cutouts.

5. The motor vehicle as claimed in claim 1, wherein at least one of the cutouts is an oblong hole.

6. The motor vehicle as claimed in claim 1, wherein at least one of the cutouts is configured to allow a displacement, in two mutually perpendicular directions, of the first fastening element which projects through the second cutout.

7. The motor vehicle as claimed in claim 1, wherein the first fastening elements have a thread, and the connectors have third fastening elements which are configured to be screwed onto the thread of the first fastening elements.

8. The motor vehicle as claimed in claim 7, wherein the drive is fixable to the body by the third fastening elements being screwed in a direction of the second fastening elements.

9. The motor vehicle as claimed in claim 7, wherein the air-guide is a rear spoiler which is fastened to a tailgate of the body, wherein the cutouts are arranged in the tailgate, wherein the tailgate is openable and closeable, wherein the third fastening elements, in the state in which they are screwed onto the first fastening elements, are concealed when the tailgate is closed.

10. A method for mounting a drive that adjusts an air-guide on a motor vehicle, the method comprising:
    placing the drive on a closed tailgate of the motor vehicle, such that first fastening elements which project through the tailgate are introduced into second fastening elements up to a mounting position, wherein the second fastening elements are arranged on the drive;
    introducing the first fastening elements further into the second fastening elements up to a clamping position in which the second fastening elements exert a clamping force on the first fastening elements;
    opening the tailgate; and
    screwing third fastening elements onto the first fastening elements, such that the tailgate is clamped in between the third fastening elements and the second fastening elements.

* * * * *